May 8, 1951  H. L. McNEILL  2,552,378
METHOD AND MEANS FOR SELECTIVE MEDIA SEPARATION
Filed Nov. 23, 1945  4 Sheets-Sheet 1
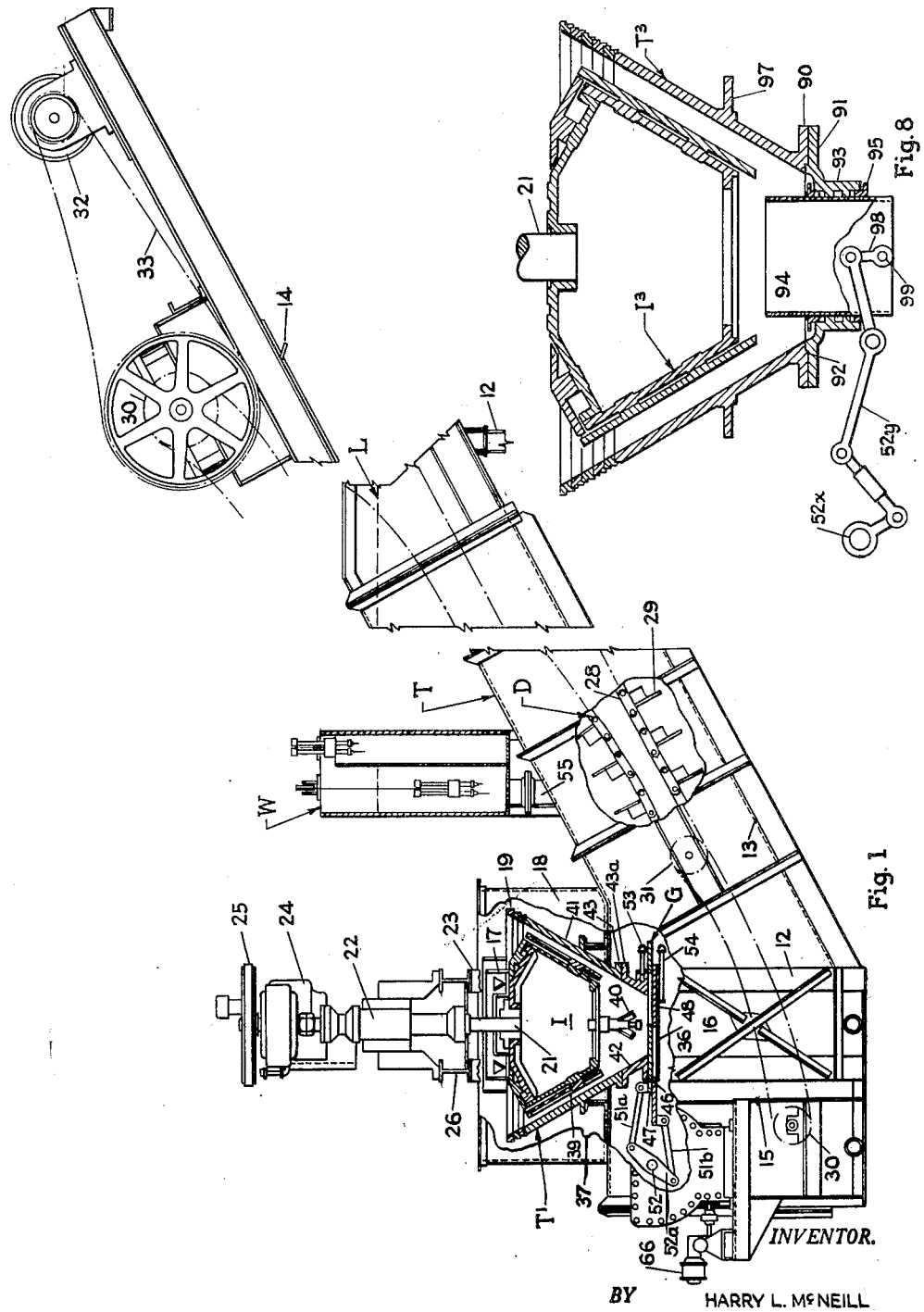
INVENTOR.
HARRY L. McNEILL
BY
ATTORNEY

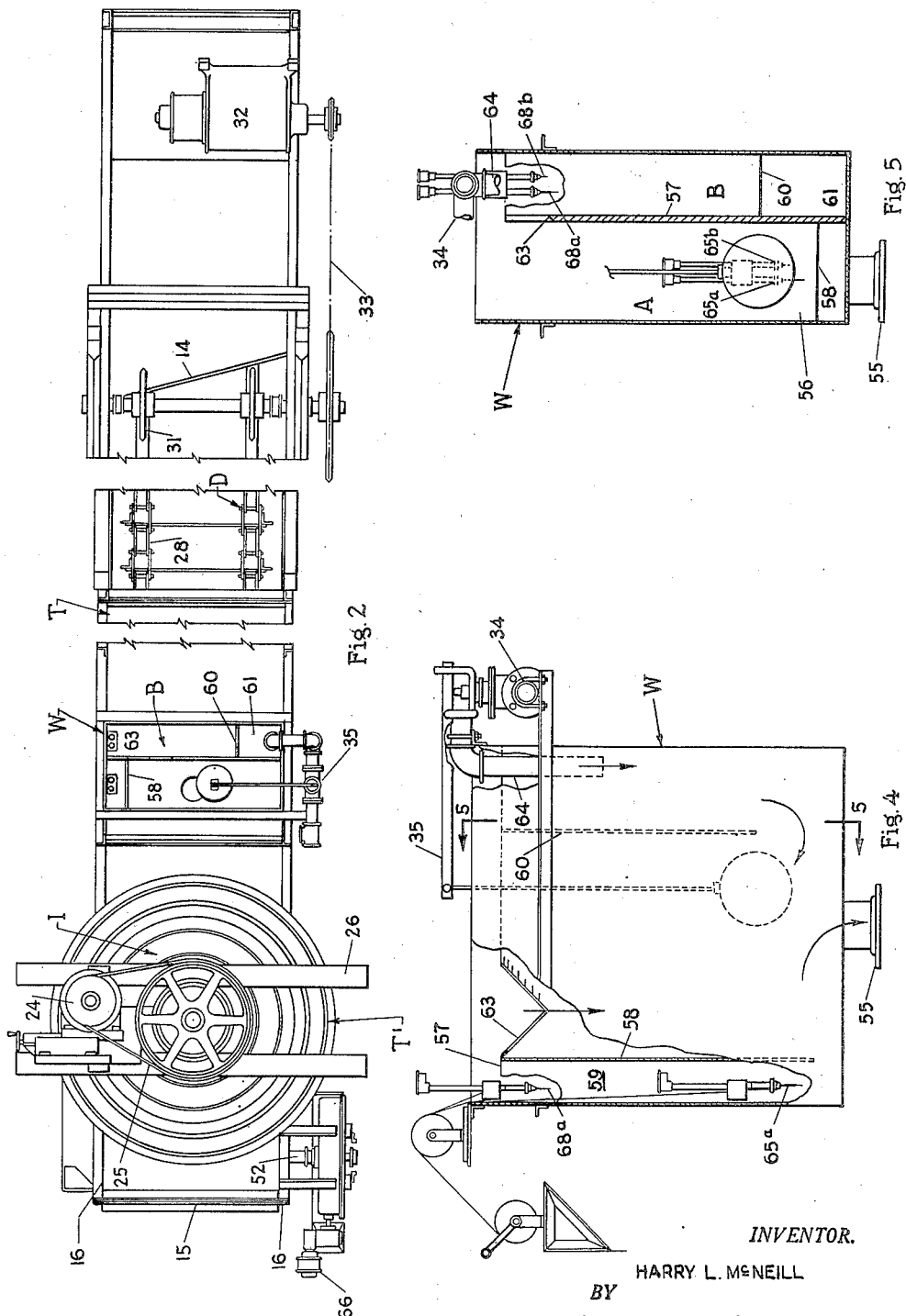

May 8, 1951　　　　　H. L. McNEILL　　　　　2,552,378
METHOD AND MEANS FOR SELECTIVE MEDIA SEPARATION
Filed Nov. 23, 1945　　　　　　　　　　　　　4 Sheets-Sheet 3
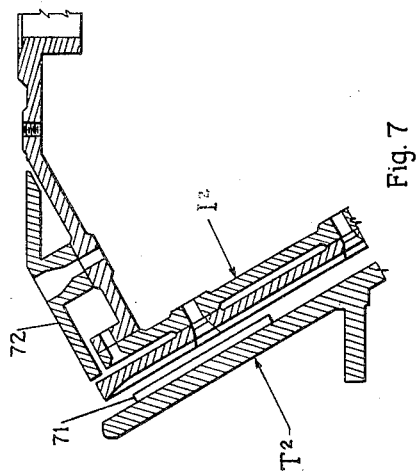
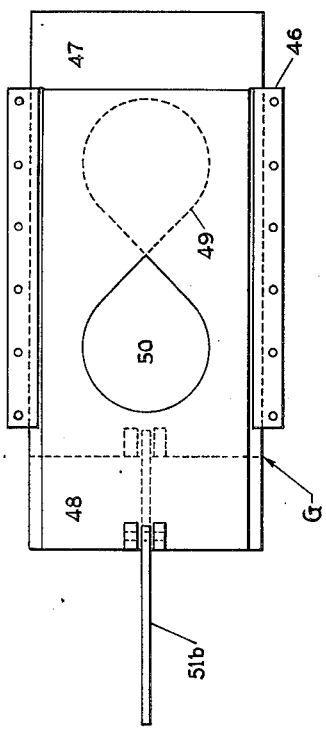
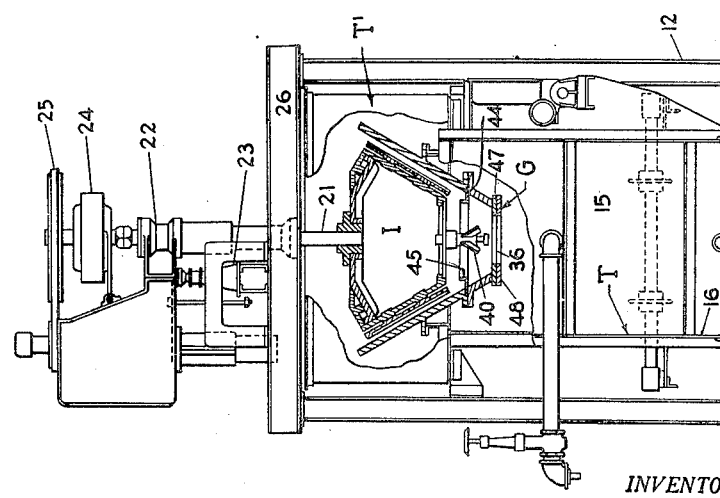
INVENTOR.
HARRY L. McNEILL
BY
ATTORNEY Patented May 8, 1951

2,552,378

UNITED STATES PATENT OFFICE 2,552,378

METHOD AND MEANS FOR SELECTIVE MEDIA SEPARATION

Harry L. McNeill, Denver, Colo.

Application November 23, 1945, Serial No. 630,465

28 Claims. (Cl. 209—159)

This invention relates to the art of classifying or concentrating constituent solids of a mixed material, such as ore, and to apparatus for performing such treatments. The subjects matter of the present invention are related to the disclosures of my co-pending application, Serial No. 461,648, filed October 12, 1942, for Method and Means of Treating Solids in Liquids, now Patent No. 2,422,203. Features described but not claimed herein have been claimed in the aforesaid application, or in my copending application, Serial Number 215,077, filed March 12, 1951, for Ore Concentration and Apparatus Therefor.

As disclosed in my earlier application, it is possible to form a selective media body from constituents of mixed solids in a liquid carrier vehicle by subjecting such a pulp to centrifugal movement in a relatively-narrow, annular zone having a normally-open, restricted bottom discharge for the sink product by initially restricting or closing said discharge during rotation of the material. Thereafter, this treatment zone is subject to continuous feed and discharge of the sink product through the lower opening, while the float product is removed by overflow at the top, with the selective media body sorting the solids of the incoming feed according to their sink and float characteristics therein.

In order for such an operation to function efficiently, it is necessary to vary the discharge, particularly, of the sink product so that it substantially balances the rate of introduction of the sink product in the feed. Another factor influencing the separation is the quantity and rate of flow of liquid in the treatment zone.

It is an object of the present invention to provide a simple, efficient and economical method for separating constituent solids of a pulp according to their sink and float characteristics in a continuous operation in which the rate of sink product discharge is automatically balanced to the rate of introduction of the sink product constituent in the incoming feed.

Another object of the invention is to provide simple, durable and efficient apparatus for continuously separating a constituent solid of one specific gravity from another or a plurality of constituents of different specific gravity in a body of mixed solids in divided condition in a continuous operation, in which the density of the body is continuously measured to insure uniform separation of said solids.

A further object of the invention is to provide in apparatus for performing sink and float separations, means for varying the effective volume of the zone in which such treatment is performed.

Still another object of the invention is to provide in apparatus for performing sink and float separations, means for regulating the density of the material under treatment.

Other objects reside in the provision of novel steps and treatments and in novel combinations and arrangements of parts, all of which will be fully described in the course of the following description.

The present invention utilizes the treatment procedure of my aforesaid application Serial No. 461,648, now Patent No. 2,422,203. In order to permit continuous operation involving the treatment of large tonnages of material, I have provided in the present form of apparatus automatic control permitting complete closure of the sink product discharge during the initial media formation action and automatic balancing of sink product discharge to the quantity of sink product in the incoming feed in the subsequent operation. Provision also is made for varying the gap between the tank and rotor in the region in which the selective media is maintained in the treatment, and when the spacing of the gap tends to cause a reduction in differential movement of the float product and sink product constituents, as sometimes occurs, or if the top of the bed becomes static, these conditions are overcome through the provision of agitating means which may be located either along the wall of the tank in proximity to the top of the rotor or at the top of the rotor. As disclosed in said patent, the treatment procedure may be utilized in separations which are primarily size classification and sink and float products as described and claimed herein are intended to apply to products segregated as to size as well as those segregated solely according to differences in specific gravity.

In all of such operations, media is or may be formed from constituents of the incoming feed which is different in composition from the incoming feed, the overflow product, or the sink product and of high enough density to exert a pronounced sorting action according to sink and float characteristics on the constituents of the incoming feed material. With this understanding of the type of operation provided in the practice of the present invention, reference will be made to the accompanying drawings illustrating apparatus suited for the performance of the process of the present invention. In the drawings, in the several views of which like parts have been designated similarly:

Fig. 1 is a fragmentary side elevation of apparatus embodying features of the present invention, partially broken away to show the arrangement of interior parts;

Fig. 2 is a fragmentary top plan view of the apparatus shown in Fig. 1;

Fig. 3 is an end elevation of the apparatus shown in Fig. 1, partially broken away to illustrate the arrangement of interior parts;

Fig. 4 is an enlarged end elevation of the water feed control shown in Fig. 1 and partially broken away to show the arrangement of interior parts;

Fig. 5 is a section taken along the lines 5—5, Fig. 4;

Fig. 6 is a bottom plan view of the sink product discharge control utilized in Fig. 1;

Fig. 7 is a fragmentary vertical section illustrating another modified form of tank and rotor construction;

Fig. 8 is a fragmentary vertical section illustrating another form of control of the sink discharge from a separator of the type shown in Fig. 1.

Figure 9:
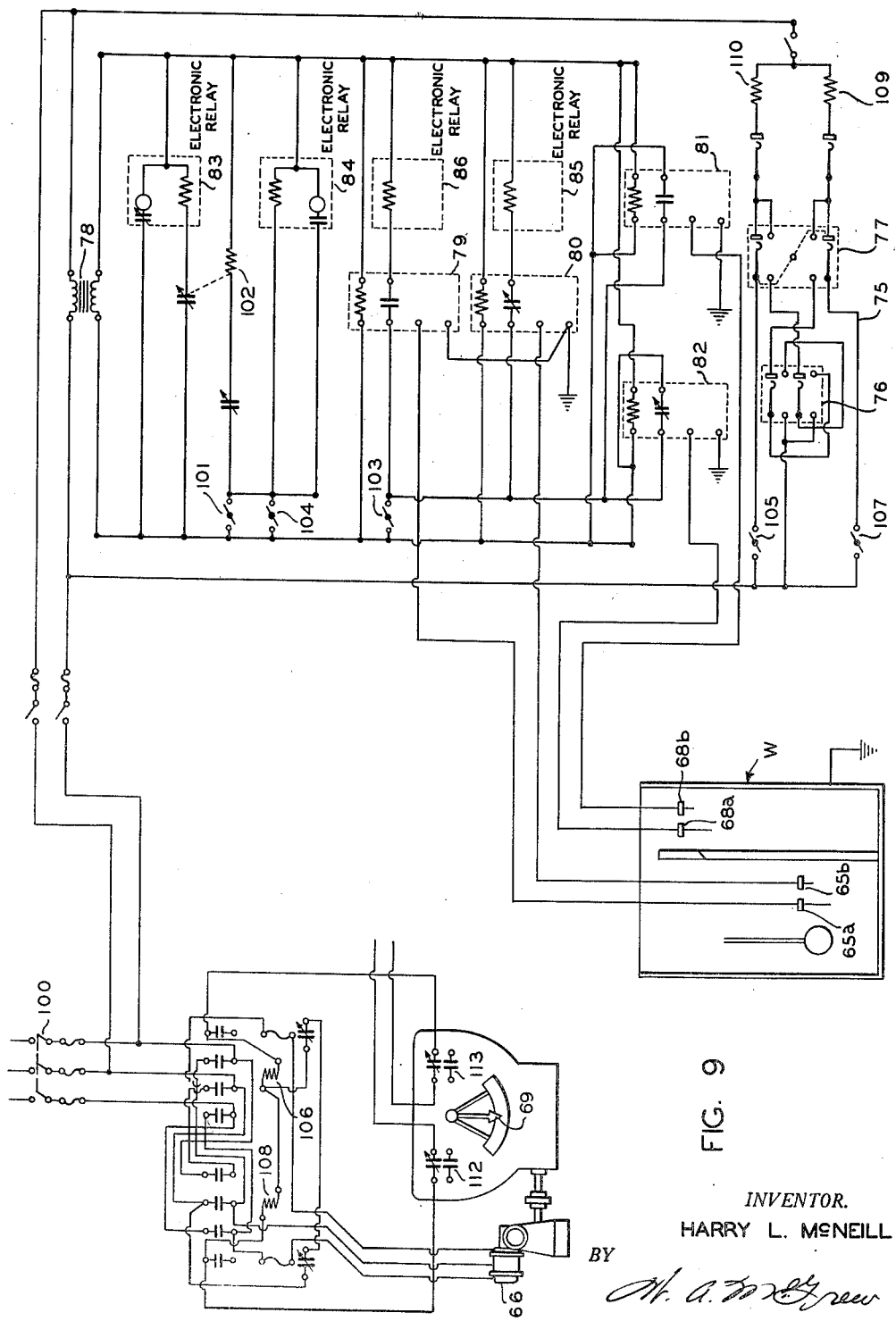
Fig. 9 is a wiring diagram of the control units shown in Fig. 1.

As will be best understood by reference to Figs. 1, 2 and 3, a preferred form of apparatus embodying features of my invention comprises a tank T having its bottom 13 inclined substantially throughout its length and providing an upper concentrate discharge 14 while the lower end of the tank is closed by an end wall 15 and adjoining side walls 16. A treatment tank T' preferably formed as a bowl and having at its periphery a pulp feed box 17 and an overflow box 18 is suitably supported as by columns 12 above the lower end of tank T. Additional support is provided for the upper end of tank T by the plurality of upright columns 12. The boxes 17 and 18 are arranged in close proximity to one another and incoming feed is caused to flow through as much as 270°, for example, before it reaches a point of peripheral overflow discharge. A massive impeller I, the details of which will be subsequently described, is mounted for rotation within tank T' on a shaft 21 journalled in bearings 22 carried by an adjustable supporting member 23 to permit elevation and descent of the impeller within the bowl to vary the gap between the impeller and bowl and thereby vary the extent of the cylindrical zone underneath the impeller. The shaft is driven by a motor 24 through suitable belt transmission 25 mounted on superstructure 26 above the bowl.

The sink product discharge is directed through a cylindrical passage in the bottom of tank T' and into tank T where it is elevated by suitable drag conveyor mechanism D, preferably in the form of an endless member 28 carrying blades 29, which passes around end sheaves or sprockets 30 and over a series of idlers 31 for movement of the sink product along inclined bottom 13 to the elevated point of discharge 14. The member 28 is driven by a motor 32 through the provision of suitable transmission 33.

A water feed box W is mounted on tank T and has an entering water supply line 34 (Fig. 4) controlled by float valve mechanism 35 in a manner to be described hereinafter. Through suitable control of the water inlet, a positive superelevation may be maintained in tank T which provides upwardly flowing currents in tank T' which assist in the separation performed therein and also function in part as the density control medium of the treatment.

The sink product discharge from tank T' into tank T is controlled by an automatic gate mechanism G, the details of which will be described hereinafter, which is utilized in initial stages of the operation to effect the media formation and thereafter controls the rate of sink product discharge in balanced relation to the sink product content of the incoming feed.

The sink and float separation performed in tank T' produces a final concentrate of the treatment. When the valuable constituent of the feed is a sink product, as in iron ore treatment, for treatment, for example, the solids descending through the discharge outlet 36 into tank T are a concentrate, which is moved upwardly along the inclined bottom 13 to the elevated point of final discharge at inclined lip 14. If the valuable constituent is the float product, then the solids delivered over weir 19 into overflow box 18 and finally through the outlet 37 constitute the final concentrate product.

The product discharged across lip 14 is substantially dewatered because of its movement for a substantial distance along inclined bottom 13 after passing above the liquid level indicated by the dotted line L (Fig. 1). Consequently, in some treatments this product will be taken for shipment or use, while at other times it will be necessary to pass it to a dryer or other treatment stage. Also, where a high ratio of concentration is required, a series treatment may be employed with the concentrate of a first stage fed to a second concentrator of the same type, and so on until a concentrate of the desired grade is obtained.

In the preferred form of the apparatus as illustrated in Figs. 1, 2, and 3, a free flowing pulp is delivered into feed box 17 and then flows into the frustro-conical tank T'. The impeller is rotated at a suitable speed, and initially the sink product outlet 36 is closed or substantially so. Preferably, the outer surface of the impeller I is provided with a series of grooves 39 which prevent slippage and enhance the spinning effect of the liquid and part of the solids associated therewith. A thin skin of water forms at the impeller and in addition to rotating at high velocity, also has a pronounced upward component.

This impelling action exerts a sorting action on the solids of the pulp. Constituents of greater specific gravity are thrown to the outside while lighter gravity constituents tend to remain nearer the impeller and whenever they are brought in contact with the water skin on the impeller, they are elevated rapidly until they reach the surface and pass from the treatment by overflow. Soon after the operation begins, the feed material divides into an outer high density body descending in a slow spiralling movement and the inner lighter density body, inclusive of the water skin, rising rapidly in a spiralling movement.

The descending solids column compacts progressively in its pasage to the discharge outlet. If fines are present in the feed, they fill the voids between the coarser particles and tend to expell water from the voids. By the time the sink product column has descended below the bottom of the impeller, it contains little entrained water. A substantial space is provided between the bottom of impeller I and the outlet 36 in the form shown in Fig. 1. On entering this zone, the compacted column is free to expand and the water provided by a superelevation maintained in tank T as indicated by Level L penetrates the descending body in the displacement action and thus helps to provide a free flowing discharge. This water flowing into the dispersed pulp supplies the necessary makeup water for the material in the annular zone and probably reaches the zone along the lower end of the impeller grooves 39.

A crowfoot agitator 40 is mounted in depending relation on impeller I and keeps the descending material loosened sufficiently and moving toward the discharge so that the head in tank T will feed water into tank T' at a substantially constant rate. In addition, this agitator acts as a liquid-diffusing means to assist the water penetration as just described.

The tank T' preferably is of two-part construction with the upper section 41 and the lower section 42 having adjoining flanges 43 and 43a respectively, which may be joined as by bolting or in any other suitable manner. The adjoining flanged surfaces may have male and female parts of the type shown at 44 in Fig. 3 to prevent loosening of the joined surfaces under lateral stresses imparted by the action of the gate control mechanism G. This two-part arrangement also permits insertion of one or a plurality of retarding rings 45 (Fig. 3) and replacement of same as required.

Due to excessive wear on a part only of the surfaces of the tank T' and to lack of machining of the surfaces of the tank and the impeller, the sink product may tend to segregate along certain areas of the annular zone and to descend therefrom in greater volume than in other areas. The insertion of a ring between flanges 43 and 43a as above described in the cylindrical zone offsets these tendencies and effects a uniform rate of solids discharge and a uniform rate of water counterflow.

The inner diameter of this ring and the spacing of the ring from the bottom of impeller I determine the angular path of discharge. A similar effect is obtained by varying the effective size of the gate opening. Experiments have demonstrated that when 3/8 inch iron ore is being treated in a 60° cone, an angle of from 28° to 30° is necessary to obtain a free discharge action and flattening the angle by only a few degrees, as to 26° for example, will cause the sink product to be too tightly compacted to discharge freely.

As illustrated in Figs. 1 and 3, the gate control mechanism is mounted on the lower end of tank T' to control the sink product discharge through outlet 36. The tank section 42 has lower flanged portions 46 providing guideways for an upper sliding plate 47 and a lower sliding plate 48, each having an opening respectively designated 49 and 50 (Fig. 6), which are adapted to be moved into alinement when the plates 47 and 48 are actuated by links 51a and 51b driven from a crank 52a on a shaft 52. In order to prevent entrance of small particles between the plates which might lodge therein and interfere with the positioning of said members, water under pressure is fed between the plates by two supply lines 53 and 54 which keep the contact surfaces swept clean of particles.

The relationship of openings is varied from a full open position to a substantially closed position and the normal setting is intended to keep coarse float material just above the peripheral edge of impeller I. At the start of an operation, the gate is substantially closed and then opens to the proper operating position after the selective media bed has been formed. The control of the gate actuation preferably is fully automatic, although in the arrangement shown in the drawings a manual switch has been provided in the circuit to permit manual adjustments if desired. The circuit control arrangement is used for operation of gate control mechanism G.

Another feature of the operating control of the apparatus shown in the drawings is the water introduction control in tank T (Figs. 2, 4, and 5). The outlet 55 of water feed box W delivers water into tank T. For any given setting of the gate for a given flow of ore, a certain level will be maintained in the float chamber 56 of box W. A partition 57 divides the interior of the box into two compartments, namely, the downstream compartment A and the upstream compartment B. Compartment A is divided by a partition 58, which terminates in spaced relation to the bottom of the box, into a control chamber 59 and the aforementioned float chamber 56. The compartment B is divided by a partition 60, also spaced from the bottom of box W, into an inlet chamber 61 and an overflow chamber 62.

Water from the supply line 34 passes into an outlet conduit 64 at a rate determined by the setting of float valve mechanism 35 and then flows under partition 60 into overflow chamber 62 where it passes through a slot weir 63 in partition 57 into compartment A and then flows out of float chamber 56 through outlet 55. A portion of the water entering float chamber 56 passes under partition 58 and enters control chamber 59. The ball float of mechanism 35 is mounted for selective adjustment vertically along its stem to provide the desired setting.

Under the aforesaid gate setting, if the feed becomes lighter in gravity or less in quantity and the gate setting remains unchanged, the level in compartment 56 drops and the changed position of the float causes the valve controlling the water introduction to admit more water through outlet conduit 64.

When an automatic control is provided as illustrated in Figs. 4 and 5, whenever this drop in level exposes both of the probes 65a and 65b permitting them to dry, the motor 66 controlling shaft 52 slightly closes the opening at outlet 36 to reestablish the superelevation in float chamber 56. If the level continues to go down, at a rate so fast it will not be stopped by intermittent gate closing, as in the case of a feed shutdown, then the float goes down with it and causes the flow of water above weir 63 to rise rapidly until the uppermost probe 68b in compartment B is wetted. This probe controls motor 66 continuously without going through the control cabinet circuit and closes the gate opening until stopped by a limit switch 69. At this point the water level will rise in float chamber 56 and return the gate to the control of downstream probes 65a and 65b.

As the feed comes on, the density builds up in the annular zone of tank T' causing a level rise in float chamber 56 to a point where both downstream probes 65a and 65b become wet, which starts gate opening intermittently by the time switch control. If the intermittent opening is not fast enough, the water level will rise until the float valve is almost closed at which time both upstream probes 68a and 68b become dry. This condition causes the control panel to be by-passed and the gear motor 66 to open the gate until the water level at the downstream probes has covered probe 65a leaving probe 65b dry. This condition automatically brings the downstream probes into running control and leaves the upstream probes in a condition in which probe 68b is dry and probe 68a is wet. In order to provide a simple adjustment of the probe positions in the initial setting, I prefer to use a windlass and line assembly as indicated in Fig. 4.

In operating with apparatus embodying the control features hereinbefore described, the gate control mechanism G opens the discharge passage after the initial media formation and thereafter by the intermittent opening and closing movements serves to maintain the rate of sink product discharge in balanced relation to the amount of sink product in the entering feed. If at the same time, the water introduction from tank T into tank T' is varied by the hydraulic control system and thus provides additional control of the rate of sink product discharge there is any feed failure, the discharge opening may be closed or partially closed as previously described and maintained in closed position until such time as the feed comes on and the operation is ready to resume. Through this arrangement, the formed media bed is retained in the machine and it is unnecessary to re-form the media after ordinary shut-downs.

The feed material entering tank T' through feed box 17 is immediately subjected to the action of the impeller and moved in a spiralling path which subjects the solids of the pulp to an initial sorting action. Constituents of heavier specific gravity settle into and through the selective media bed while lighter constituents are crowded to the inside and given an elevating component by the water skin on the impeller. Any float product entrained with the sink product and moved thereby toward the sink product discharge is forced out of the spaces between other particles by the compacting action so that by the time the sink product column reaches the lower end of the impeller, little, if any, float material will remain therein.

In the treatment of ⅜ inch iron ore, the water supplied with the pulp constitutes the greater portion of the liquid in the upper treatment zone of tank T'. The fresh water entering the lower portion of the treatment zone through opening 36 elevates the slimes which the ore particles have scrubbed from one another in the treatment zone. After discharge through outlet 36, the sink product falls into the bottom of tank T and is collected by the blades 29 on the endless member and moved along the inclined bottom 13 to a final point of discharge from the machine at the lip 14.

As clearly illustrated in Fig. 1, the impeller I preferably is formed as a hollow member which may be cast iron or any other suitable composition. In the preferred construction, wear surfaces are provided on the exterior surfaces of the impeller as by bolting and these surfaces may be white iron or any other suitable wear-resistant composition. Through this arrangement, undue weight and excessive power consumption are avoided in the tank T' assembly without any sacrifice of durability or operating efficiency.

Fig. 7 illustrates a modified form of tank and impeller arrangement which may be effectively used under certain conditions. If the spacing of the gap between impeller and tank required for handling a suitable tonnage of material causes a reduction in the differential movement of sink and float products below that considered essential to economical operation, some means must be provided for maintaining the required differential while increasing the width of the gap. Thus in Fig. 7, the tank $T^2$ otherwise similar to tank T' has a series of peripherally-spaced upwardly ranging bars or blades 71 disposed with their top surfaces at or near the upper peripheral edge of the impeller. This has the effect of narrowing the gap in this region and also imparts an undulating movement to the centrifugal movement of material which serves to maintain the proper differential rate of movement between the ascending and descending columns.

In normal operation with most pulps, the top of the bed of float material will be agitated sufficiently so that the entering feed penetrates readily therethrough. With some materials, the top of the bed becomes static to such an extent that the feed does not penetrate readily. One means of overcoming this difficulty is to place one or a plurality of rods or bars 72 in radial arrangement on the top of the impeller $I^2$ (Fig. 7). This causes the top of the bed to wave or pulsate permitting the sink product to penetrate readily and also transports the coarse waste to the overflow point. While Fig. 7 illustrates both control means embodied in a single construction, it will be understood that either the blades 71 or rods 72 may be omitted, if desired.

The control panel 75 (Fig. 9) used in regulating the operation of gate control mechanism is mounted on a suitable framework (not shown). As previously explained, a manual switch 76 is provided to permit manual adjustment of gate setting positions when desired. Another switch 77 establishes the automatic operation previously described.

A control transformer 78 is mounted on panel 75 and is connected in circuit with the switches 76 and 77 and with an electronic relay 79 connected in circuit with probe 65b and an electronic relay 80 connected in circuit with probe 65a, an electronic relay 81 connected in circuit with probe 68b and an electronic relay connected in circuit with probe 68a. An off-time switch 83 (electronic relay type) and an on-time switch 84 (electronic relay type) also are located on panel 75 and arranged in circuit with the electronic relays 79, 80, 81 and 82, and a control relay (closed) 102, a control relay (open) 86 and a control relay (time) 85 also are arranged in circuit with the aforesaid relays and switches. These circuits provide the several operational controls of the gate mechanism previously described.

The concentrate discharge is operated by the motor 66 through a double gear reduction unit. The gear ratio requires about a six minute operating interval from a fully closed to a fully open position. In addition an increment opening or closing movement is provided amounting to approximately $\frac{1}{16}$" each three minute interval. This operation is obtained by having the time on relay 84 set for 1½ seconds of operation and the time-off relay 82 set for 3 minute operation.

The gear ratio is such as to require 6 minutes of operating time for the control gate to move from one extreme position to the opposite extreme position for a total movement of about 15 inches. Thus it will be seen that when the motor operates for 1½ seconds, the movement of the gate will be $\frac{1}{16}$ inch.

As shown in Fig. 9, the motor 66 is controlled by a three pole double-throw starting switch 100. A selector switch 76 is provided for hand or automatic operation of the control. By setting the switch 76 on hand operation, the machine operator can actuate switch 77 to open or close the gate control. In addition, if switch 76 is set on automatic operation, the automatic relay control system takes over and the various movements of the control mechanism G are effected by the water level positions in the weir tanks in relation to the several probes. Two limit switches 112 and 113 are mounted on the gate gear box and the former cuts the motor circuit when the gate is fully opened, and the latter cuts the motor circuit when the gate is fully closed.

Therefore, if the circuit control switch 100 is closed, power is supplied only to a time-off relay 83. After a determined time lag, determined by the relay setting, contact 101 closes, which energizes relay 102 through normally closed contacts on time-on relay 84. Thereafter relay 102 applies power to the coil of time-on relay 84.

The time-on relay 84 determines the length of time that power is supplied to operate the gate motor 66 through other relays, for the increment movement of the gate control mechanism G. At the end of this time cycle, contact 104 opens to drop out relay 102 and start the timing cycle again on off-time relay 83. During the on-time in which relay 102 is energized, contact 103 closes to apply power in series with relay 79, which controls the open operation of the gate motor when the water level in the downstream weir tank reaches the upper probe and wets it.

After contact 103 closes to energize relay 86, contact 105 of relay 86 closes to energize open gate coil 106. If the upper probes in the downstream weir tank remain wet, the control operation would be repeated on the same time interval until a balanced operation is re-established. However, after water level in the downstream weir tank drops below the lower probe during the on-time operation and it becomes dry, relay 80 closes relay 85 and thereby closes relay contact 107, which operates the close gate coil 108. This operation will repeat until a balanced operation is established.

If the water in the upstream weir tank rises until the upper probe becomes wet, the contacts on relay 82 close and the circuit in series with the normally closed contacts on relay 80 energizes relay 109, closing the contacts thereon to close the gate motor circuit. This operation also is continuous until a balanced operation is again established and the probes in the downstream weir tank take over the control.

Likewise, if the water in the upstream weir tank falls below the lower probe and the probe becomes dry, contacts on relay 81 will close and being in series arrangement with other contacts on relay 79, will magnetize relay 110, thereby opening the control gate continuously until a balanced operation is re-established and the probes in the downstream weir box take over control.

As depicted in Fig. 9, the hand-automatic selector switch 76 is shown closed for automatic operation. But for manual control, the power would be applied through the "open-close" switch 77, which is a push button, momentary contact type and must be held down to operate the gate.

While the gate control mechanism G is well suited to control the sink product discharge in the manner described hereinbefore, another form of control mechanism has been illustrated in Fig. 8.

In this arrangement, the bowl of tank $T^3$ preferably is formed as a unitary structure and is provided with flanges 90 against which a closure member 91 is held as by bolting. The adjoining surfaces of flanges 90 and closure member 91 have fitted male and female parts as indicated at 92 to prevent relative movement of these parts in a horizontal direction. The closure member has a central passage provided by an upstanding tubular portion 93 and a second tube 94 is mounted in telescoping arrangement in tubular portion 93. Suitable stuffing boxes 95 are mounted at the top and bottom of tube 93 to prevent leakage between the adjoining surfaces, and a passage (not shown) is provided for introduction of a suitable lubricant between the telescoping surfaces.

Additional flanges 97 are provided for mounting tank $T^3$ on suitable surfaces of a tank which is generally similar in construction to tank T (Fig. 1) and performs the same function in the treatment. Movement of telescoping tube 94 is imparted from a shaft $52^x$, corresponding to the shaft 52 (Fig. 1), through a crank system $52^y$ and a link 98 having a two-point pivotal connection with tube 94 through bosses 99. The control mechanism for actuating gate mechanism G previously described is adapted to actuate the telescoping adjustment of the discharge passage shown in Fig. 8.

When it is necessary to cut off the sink product discharge as in the case of feed failure or in the initial media formation, the discharge control mechanism is operated to raise the top of tube 94 to such a high point that the solids passing out of the bottom of the annular passage will not carry over the top of tube 94. When regular operation resumes, the top of tube 94 is lowered until it assumes the correct angle for making the separation.

From the foregoing description, it will be apparent that the mechanism shown in Fig. 8 is a functional equivalent of the gate control mechanism G, and may be controlled by the electronic control mechanism previously described to provide all the control functions of the sink product discharge hereinbefore described. In particular, during protracted periods of normal operation there will be intermittent raising and lowering of tube 94 within rather narrow limits to accommodate feed fluctuations and keep the system in balance.

All the foregoing structural arrangements utilized in the practice of the present invention provide the same type of concentrating or separating action. After the level L has been established at the beginning of an operation, even slight changes in the density of the body of material in the annular treatment zone, usually due to variations in the sink product content of the feed, cause a change in level in float chamber 56, which immediately is communicated through the electronic control system to change the rate of sink product discharge and thus compensate for the changed condition of the pulp.

Where the specific gravity of the sink product is substantially greater than the specific gravity of the float material, any substantial change in the ratio of sink product to float product causes a change in level in the float control chamber. Likewise, size changes in either constituent may produce a similar level change with consequent change in discharge control position. All such changes in feed cause density changes in the annular zone which are compensated for immediately by the gate adjustment.

In a commercial size machine of the type shown in Fig. 1, operating on a ⅜ inch iron ore, it has been determined experimentally that the best separation will be obtained by using an impeller of 51 inch diameter at the top of the annular passage and providing a gap of 2½ inches adjacent the upper peripheral surface of the impeller. However, it should be understood that the gap will be varied in accordance with size changes and other conditions of the pulp and the optimum condition in the treatment of any ore will be determined experimentally.

If the gap is to be widened, for example, it is necessary to raise the spindle on which the impeller is mounted and this has the effect of changing the relative positions of the upper peripheral edge of the impeller and the tailings overflow. Since the best separations usually are obtained when the overflow level is at approximately the same height as the top peripheral edge of the impeller, it is necessary to change the weir overflow setting with each change in the gap. For this reason, a screw adjustment of the overflow weir position has been provided. In the preceding description reference has been made to the superelevation L in tank T and the similar superelevation maintained in water inlet box W. In many treatments, such as the treatment of iron ore for example, it will be desirable to maintain such superelevation. However, when treating a sized product in the machine which contains little or no fines, I have found that best results are obtained if a superelevation is maintained in the cone and not in tank T and therefore it should be understood that superelevation in the raking zone is not essential under all conditions.

The drawings illustrate embodiments of the invention in which the walls of the conical tank have been set at an inclination of 60°. Experiments have shown that the 60° tank is well suited for general purpose operation, although tanks having inclinations of from 45° to 90° and embodying other features of the present design have been operated and found to give effective results. The test operations indicate that as a general rule coarser feed requires a tank with a flatter angle and fine feed a tank with a steeper angle.

The number of grooves on the impeller and the rate of rotation of the impeller are other factors that may be varied within rather wide limits. For example, a laboratory machine having an 8 inch diameter impeller and provided with ten grooves was operated at 140 R. P. M. to provide 1400 grooves per minute passing a given point in the cycle or rotation. The same ore was then fed to another 8 inch diameter impeller having seven grooves and rotated at 175 R. P. M. to provide 1225 grooves per minute passing the given point. It was found that with this increase in the impeller speed and the decrease in number of grooves, a better separation was obtained. Therefore, in adapting the machine to the treatment of a particular ore, the factors of peripheral speed, gap, number of grooves on the impeller, as well as gate setting and overflow weir setting, are factors to be taken into account in determining optimum operating conditions.

In the drawings, the probes 65a, 65b, 68a, and 68b have been shown as suspended at selective elevations within water control box W. In actual practice, I prefer to have an adjustable mounting for the probes, as previously described by which they can be moved upwardly or downwardly and held in selective positions, particularly in effecting the initial operating control. Another convenient way of effecting these settings is to have the probes suspended from a bar clampingly held by a set screw within a lug or cross bar attached to the box. When a change in position is required, as in the initial setting, the depending bar is raised or lowered until the proper position has been determined, at which time the set screw is fastened to hold the probe in the selective position until such time as another change in elevation is required.

As previously pointed out, the machine of the present invention is adapted to form its own separation media from the incoming feed material, which media I have defined as "selective media." Under some conditions, it may be advisable to supply a media to the machine as in plants utilizing other machines where the supply of such media is required and the present machine is used to treat a product from one of the other machines. So long as the selective media body or other media within the annular zone has a specific gravity intermediate the specific gravity of the sink and float products, the desired separation will be obtained and therefore the references to use of selective media in the treatment should not be interpreted as excluding the use of a separate media when required.

Frequent mention has been made of iron ore treatments, but it will be understood that a variety of materials may be treated in the present machine, particularly when it is desired to concentrate one material of a different specific gravity than one or more constituents with which it is associated. Treatments where the present type of separation will be found particularly effective are the following: Low grade iron ores, coal, recovery of copper, lead and zinc where these minerals are coarsely crystalline, and the recovery of metal from crushed blast furnace slags. The foregoing are typical of the wide variety of materials that can be effectively treated by the practice of the present invention.

From the foregoing, it will be understood that the density division between sink and float products involves a specific gravity differential between two constituents in most instances, but the treatment is equally effective in utilizing a size division of a single constituent in which event one size range will constitute the float product and another size range will constitute the sink product.

Another feature of the control of the present invention is the arrangement of the hydraulic body about the sink product outlet. Usually, the controlled amount of hydraulic fluid is caused to pass from tank T into tank T' countercurrent to the descending sink product through the provision of suitable superelevation of low density liquid in tank T which passes into the higher density fluid in tank T' under the hydrostatic head thus provided. In addition, the float valve controlling the water introduction in tank T also operates to supply additional water whenever conditions within tank T' require. The measurement of density changes in tank T' is used to regulate sink product discharge by the various methods hereinbefore described and since the rate of counterflow is determined to a large degree by the rate of displacement at the outlet, the regulation of the outlet position in response to measured density changes serves to control the rate or volume of hydraulic counterflow.

In the various forms of apparatus illustrated in the drawings, I prefer to use a feed box and overflow box mounted at the periphery of the tank. It should be understood that it is quite practical to introduce the feed centrally at the top of the impeller and to provide an adjustable circular overflow weir at the top of the tank walls with an overflow launder placed below the weir to collect the discharge, as shown in Fig. 1.

The structural forms disclosed in the drawings are intended to show the variety of combinations and arrangements of parts that may be utilized in the present invention and are not intended to limit the invention, the scope of which has been set forth in the hereunto appended claims.

In the preceding description reference has been made to the cylindrical zone and cylindrical outlet passage underlying the impeller. "Cylindrical" as used in this specification is intended to mean any form which is substantially in the shape of a cylinder, although not necessarily of equal diameter at its ends. Also, because in the forms shown, the cylindrical passage at the outlet is immediately below the aforesaid cylindrical zone under the impeller, the cylindrical space of this invention comprises both cylindrical areas.

Because the material in the cylindrical zone is supported by the shelf-like structure at the bottom of the tank, said material in turn provides some of the support for the material in the annular zone. Based on this concept of the zone arrangements, the annular zone as referred to herein is considered as having its lower terminus in the plane of the bottom of the impeller.

With respect to the structural forms of the invention previously described, it should be noted that the cylindrical zone beneath the impeller forms an annular layer of discharging solids which is of variable extent. Movement of the impeller relative to the tank, or movement of the tank outlet relative to the impeller changes the upper or lower level or position of this annular layer as it changes the extent of the cylindrical zone. Each such change provides a regulation of sink product discharge, which in turn produces a change in float product discharge.

What I claim and desire to secure by Letters Patent is:

1. In ore treating apparatus, a tank, including an upright circular wall portion, an upper float product outlet, and a bottom provided with a central sink product outlet, a rotary, massive impeller having an upright surface defining with said wall portion a relatively narrow, annular zone and defining with said bottom a substantially cylindrical zone for a crowding discharge movement of sink product to said bottom outlet, said bottom outlet being spaced in a horizontal plane a substantial distance inwardly from said annular zone, means adjustable during rotation of said impeller for varying the discharge through said bottom outlet, and means for agitating the sink product during its progress through said cylindrical zone.

2. In ore treating apparatus, a tank, including an upright circular wall portion, an upper float product outlet, and a bottom provided with a central sink product outlet, a rotary, massive impeller having an upright surface defining with said wall portion a relatively narrow, annular zone and defining with said bottom a substantially cylindrical zone for a crowding discharge movement of sink product to said bottom outlet, said bottom outlet being spaced in a horizontal plane a substantial distance inwardly from said annular zone, and means adjustable during rotation of said impeller for changing the angular course of sink product travel through said cylindrical zone.

3. In ore treating apparatus, a tank, including an upright circular wall portion, an upper float product outlet, and a bottom provided with a central sink product outlet, a rotary, massive impeller having an upright surface defining with said wall portion a relatively narrow, annular zone and defining with said bottom a substantially cylindrical zone for a crowding discharge movement of sink product to said bottom outlet, said bottom outlet being spaced in a horizontal plane a substantial distance inwardly from said annular zone, means adjustable during rotation of said impeller for varying the discharge through said bottom outlet, and pulp-agitating means supported in a depending position from the bottom portion of the impeller.

4. In ore treating apparatus, a tank, including an upright circular wall portion, an upper float product outlet, and a bottom provided with a central sink product outlet, a rotary, massive impeller having an upright surface defining with said wall portion a relatively narrow, annular zone and defining with said bottom a substantially cylindrical zone for a crowding discharge movement of sink product to said bottom outlet, said bottom outlet being spaced in a horizontal plane a substantial distance inwardly from said annular zone, means adjustable during rotation of said impeller for varying the discharge through said bottom outlet, means for holding a body of liquid outside said bottom outlet under sufficient head to circulate upwardly through said outlet, and rotary liquid-diffusing means mounted at the bottom of the impeller.

5. In ore treating apparatus, a tank, including an upright circular wall portion, an upper float product outlet, and a bottom provided with a central sink product outlet, a rotary, massive impeller having an upright surface defining with said wall portion a relatively narrow annular zone and defining with said bottom a substantially cylindrical zone for a crowding discharge movement of sink product to said bottom outlet, said bottom outlet being spaced in a horizontal plane a substantial distance inwardly from said annular zone, means adjustable during rotation of said impeller for varying the discharge through said bottom outlet, means for holding a body of liquid outside the tank with its surface at least as high as the float product outlet, and rotary liquid-diffusing means mounted at the bottom of the impeller.

6. In ore treating apparatus, a tank, including an upright circular wall portion, an upper float product outlet, and a bottom provided with a central sink product outlet, a rotary, massive impeller having an upright surface defining with said wall portion a relatively narrow annular zone and defining with said bottom a substantially cylindrical zone for a crowding discharge movement of sink product to said bottom outlet, said bottom providing means for supporting an annular layer of material below the impeller in said cylindrical zone, and means for varying the vertical extent of said cylindrical zone.

7. In ore treating apparatus, a tank, including an upright circular wall portion, an upper float product outlet, and a bottom provided with a central sink product outlet, a rotary, massive impeller having an upright surface defining with said wall portion a relatively narrow annular zone and defining with said bottom a substantially cylindrical zone for a crowding discharge movement of sink product to said bottom outlet, said bottom providing means for supporting an annular layer of material below the impeller in said cylindrical zone, and means for varying the vertical position of the impeller relative to the sink product outlet.

8. In ore treating apparatus, a tank, including an upright circular wall portion, an upper float product outlet, and a bottom provided with a central sink product outlet, a rotary, massive impeller having an upright surface defining with said wall portion a relatively narrow annular zone and defining with said bottom a substantially cylindrical zone for a crowding discharge movement of sink product to said bottom outlet, said bottom providing means for supporting an annular layer of material below the impeller in said cylindrical zone, and means for varying the vertical position of said bottom outlet relative to the impeller.

9. In ore treating apparatus, a tank, including an upright circular wall portion, an upper float product outlet, and a bottom provided with a central sink product outlet, a rotary, massive impeller having an upright surface defining with said wall portion a relatively narrow annular zone and defining with said bottom a substantially cylindrical zone for a crowding discharge movement of sink product to said bottom outlet, said bottom providing means for supporting an annular layer of material below the impeller in said cylindrical zone, and means including two superposed plates having corresponding openings movable in and out of register with the bottom outlet for varying the discharge rate through said zone.

10. In ore treating apparatus, a tank, including an upright circular wall portion, an upper float product outlet, and a bottom provided with a central sink product outlet, a rotary, massive impeller having an upright surface defining with said wall portion a relatively narrow annular zone and defining with said bottom a substantially cylindrical zone for a crowding discharge movement of sink product to said bottom outlet, said bottom providing means for supporting an annular layer of material below the impeller in said cylindrical zone, and means including a sleeve verticaly movable in said bottom outlet for varying the vertical extent of said zone.

11. In the art of separating constituents of a loose material according to sink and float characteristics, a treatment tank and a rotary, massive impeller in the tank conjointly forming an annular zone and a cylindrical zone beneath said annular zone, said tank having a bottom outlet for the discharge of sink product from the cylindrical zone, and a control system for the tank, including a valve for controlling the discharge of sink product through said outlet, one automatic control member for actuating said valve to open or close said outlet in accordance with density changes in the annular zone, and a second control member arranged to continuously actuate the valve while open so as to vary the rate of sink product discharge in response to small measured changes indicatory of the rate of sink product introduction in said annular zone.

12. A system as defined in claim 11, in which the first control member inactivates the second control member whenever the density of material in the annular zone is substantially below normal.

13. A system as claimed in claim 11, in which a third control member directs a counterflow of liquid against the sink product discharge when the density of material in the annular zone falls below normal.

14. In the ore treating art in which constituents of a pulp are separated according to sink and float characteristics in a body of material of a density intermediate the float and sink products contained in such material which is moving under centrifugal influence within an annular treatment zone, the improvement which comprises moving liquid and some of the float product upwardly in the inner portion of the centrifugal zone at relatively high and progressively increasing velocity, progressively densifying the sink product in its downward progress through said zone in a slow velocity movement in encompassing relation to said high velocity material, impeding the downward movement of and compacting the sink product by causing it to travel inwardly of the bottom portion of said centrifugal influence zone in opposition to forces imparted by said zone, and agitating said compacted body in the lower portion of the zone before discharge from the treatment so as to supplement the agitation induced by the centrifugal influence in said zone.

15. Ore treating apparatus, comprising a tank having upright sides, a bottom including an elongated inclined portion forming a deep end and having a discharge outlet for sink product adjacent its elevated end, and a second tank extending upwardly out of the first tank adjacent the deep end and including an upright circular wall portion and an upper float product outlet, there being a sink product outlet passage between the first and second tanks, a rotary massive impeller in said second tank having an upright surface defining with said wall portion a relatively narrow annular zone and defining with said bottom a substantially cylindrical zone for a crowding discharge movement of sink product through said outlet passage, a feed inlet for introducing mixed sink and float material into the annular zone, means including a valve, adjustable during rotation of the impeller, for regulating the discharge through said outlet passage, means for conveying the sink product discharged into the first said tank upwardly along the inclined bottom portion to the elevated sink product outlet, the first said tank having a water supply inlet, and means for controlling the flow of liquid through said outlet passage between the first and second tanks.

16. Ore treating apparatus, comprising a tank having upright sides, a bottom including an elongated inclined portion forming a deep end and having a discharge outlet for sink product adjacent its elevated end, and a second tank extending upwardly out of the first tank adjacent the deep end and including an upright circular wall portion and an upper float product outlet, there being a sink product outlet passage between the first and second tanks, a rotary massive impeller in said second tank having an upright surface defining with said wall portion a relatively narrow annular zone and defining with said bottom a substantially cylindrical zone for a crowding discharge movement of sink product through said outlet passage, a feed inlet for introducing mixed sink and float material into the annular zone, means including a valve, adjustable during rotation of the impeller, for regulating the discharge through said outlet passage, means for conveying the sink product discharged into the first said tank upwardly along the inclined bottom portion to the elevated sink product outlet, the first said tank having a water supply inlet, and means for controlling the flow of liquid from the first tank into the second tank.

17. Ore treating apparatus, comprising a tank having upright sides, a bottom including an elongated inclined portion forming a deep end and having a discharge outlet for sink product adjacent its elevated end, and a second tank extending upwardly out of the first tank adjacent the deep end and including an upright circular wall portion and an upper float product outlet, there being a sink product outlet passage between the first and second tanks, a rotary massive impeller in said second tank having an upright surface defining with said wall portion a relatively narrow annular zone and defining with said bottom a substantially cylindrical zone for a crowding discharge movement of sink product through said outlet passage, a feed inlet for introducing mixed sink and float material into the annular zone, means including a valve, adjustable during rotation of the impeller, for regulating the discharge through said outlet passage, means for conveying the sink product discharged into the first said tank upwardly along the inclined bottom portion to the elevated sink product outlet, the first said tank having a water supply inlet, and means for controlling the flow of liquid from the second tank into the said first tank.

18. In apparatus of the character described, a tank for pulp, a massive rotary impeller in the tank and spaced from its walls to define an annular treatment zone therein and arranged to impart an upward spiralling motion to pulp constituents along the inner surface of the tank, and at least one upright blade mounted on the inner wall of said tank adjacent the top of the impeller in the path of said upwardly moving material to narrow the effective size of said annular zone and change the course of said material.

19. In apparatus of the character described, a conical tank having an upper overflow for float product and a lower outlet for sink product, and a rotary impeller in the tank for sorting material fed to the tank into sink and float products, said impeller being frusto-conical and having a series of vertical ranging radial vanes at intervals about its outer surface, and a crowfoot agitator extending from the bottom of said impeller in proximity to the apex of the tank walls.

20. In the art of separating constituent solids of a body of intermixed composition according to the sink and float characteristics of the respective constituents in a body of fluent media to concentrate at least one said composition, the improvement which comprises the treatment of such a body in a confined annular zone of substantial vertical extent, subject to continuous feed and separate discharges of the sink and float products from opposite ends of said zone, forming the fluent media in the treatment zone by supporting the material below said zone and subjecting the feed material to centrifugal movement against one surface restricting the sink product discharge through a cylindrical zone subjecting the material moving under centrifugal influence to a counterflow of liquid in opposition to the normal progressive movement of at least one said constituent through said annular zone, continuously measuring the resistance of the media body to the flow of liquid through said body, and varying the extent of said cylindrical zone for the sink product discharge from said zone after the media formation relative to the annular zone in accordance with said measured variations, so as to approximate the rate of sink product introduction with the feed.

21. In the art of separating constituent solids of a body of intermixed composition according to the sink and float characteristics of the respective constituents in a body of fluent media to concentrate at least one said composition, the improvement which comprises the treatment of such a body in a confined annular zone of substantial vertical extent, subject to continuous feed and separate discharges of the sink and float products from opposite ends of said zone, forming the fluent media in the treatment zone by supporting the material below said zone and subjecting the feed material to centrifugal movement against one surface, restricting the sink product discharge through a cylindrical zone, subjecting the material moving under centrifugal influence to a counterflow of liquid in opposition to the normal progressive movement of at least one said constituent through said annular zone, continuously measuring the resistance of the media body to the flow of liquid through said body, and decreasing the extent of said cylindrical zone for the sink product discharge from said zone after the media formation in accordance with indicated decreases in said measured variations so as to approximate the rate of sink product introduction with the feed.

22. In the art of separating constituent solids of a body of intermixed composition according to the sink and float characteristics of the respective constituents in a body of fluent media to concentrate at least one said composition, the improvement which comprises the treatment of such a body in a confined annular zone of substantial vertical extent, subject to continuous feed and separate discharges of the sink and float products from opposite ends of said zone, forming the fluent media in the treatment zone by supporting the material below said zone and subjecting the feed material to centrifugal movement against one surface, restricting the sink product discharge through a cylindrical zone subjecting the material moving under centrifugal influence to a counterflow of liquid in opposition to the normal progressive movement of at least one said constituent through said annular zone, continuously measuring the resistance of the media body to the flow of liquid through said body, and increasing the extent of said cylindrical zone for the sink product discharge from said zone after the media formation in accordance with indicated increases in said measured variations so as to approximate the rate of sink product introduction with the feed.

23. In the art of separating constituent solids of a body of intermixed composition according to the sink and float characteristics of the respective constituents in a body of fluent media to concentrate at least one said composition, the improvement which comprises the treatment of such a body in a confined annular zone of substantial vertical extent, subject to continuous feed and separate discharges of the sink and float products from opposite ends of said zone, forming the fluent media in the treatment zone by supporting the material below said zone and subjecting the feed material to centrifugal movement against one surface, restricting the sink product discharge through a cylindrical zone, subjecting the material moving under centrifugal influence to an upward counterflow of liquid in opposition to the normal progressive movement of the sink product through said annular zone, continuously measuring the resistance of the media body to the flow of liquid through said body, and varying the extent of said cylindrical zone for the sink product discharge from said zone after the media formation in accordance with said measured variations, so as to approximate the rate of sink product introduction with the feed.

24. In the art of separating constituent solids of a body of intermixed composition according to the sink and float characteristics of the respective constituents in a body of fluent media to concentrate at least one said composition, the improvement which comprises the treatment of such a body in a confined annular zone of substantial vertical extent, subject to continuous feed and separate discharges of the sink and float products from opposite ends of said zone, forming the fluent media in the treatment zone by supporting the material below said zone and subjecting the feed material to centrifugal movement against one surface, restricting the sink product discharge through a cylindrical zone, subjecting the material moving under centrifugal influence to a downward counterflow of liquid in opposition to the normal progressive movement of the float product through said annular zone, continuously measuring the rate of flow of liquid through said body in the treatment zone, and varying the extent of the float product discharge after the media formation by varying the extent of the cylindrical zone in accordance with said measured variations.

25. A process for separating constituent solids of a body of intermixed composition according to the sink and float characteristics of the respective constituents in a body of fluent media, which comprises the treatment of such an intermixture in a confined annular zone of substantial vertical extent, subject to continuous feed and continuous separate discharge of the sink and float constituents at opposite ends of said zone, forming the material fed to said zone into three vertically spaced stages of treatment by supporting the material below said zone and subjecting said material throughout the vertical extent of said annular zone to horizontal centrifugal movement along one margin thereof relative to an opposite margin, the uppermost stage being a zone of float product concentration, the intermediate stage being a zone of sorting action, and the lowermost stage being a cylindrical zone for sink product concentration, restricting the sink product discharge through the cylindrical zone, directing the incoming feed into the annular zone so as to cause constituent solids to be sorted by the media, whereby the float product is rejected by the media and carried into the float product concentration stage while the sink product penetrates the media and passes into the cylindrical zone, moving the sink product concentrate progressively from said annular zone to the cylindrical zone by the pressure of descending solids emerging from the base of said annular zone, subjecting said concentrate in its progressive movement to agitation directed in opposition to said progressive movement so as to exert a final sorting action on said concentrate, and varying the extent of said cylindrical zone to thereby change the rate of sink product discharge.

26. A process for separating constituent solids of a body of intermixed composition according to the sink and float characteristics of the respective constituents in a body of fluent media, which comprises the treatment of such an intermixture in a confined annular zone of substantial vertical extent, subject to continuous feed and continuous separate discharge of the sink and float constituents at opposite ends of said zone, forming the material fed to said zone into three vertically spaced stages of treatment by supporting the material below said zone and subjecting said material throughout the vertical extent of said annular zone to horizontal centrifugal movement along one margin thereof relative to an opposite margin, the uppermost stage being a zone of float product concentration, the intermediate stage being a zone of sorting action, and the lowermost stage being a cylindrical zone for sink product concentration, subjecting the material in the annular zone to the action of a hydraulic column moving in a direction opposite to the separative movement of one constituent of the feed, restricting the flow through the cylindrical zone, moving the sink product concentrate progressively from said annular zone to the cylindrical zone by the pressure of descending solids emerging from the base of said annular zone, subjecting said concentrate in its progressive movement to agitation directed in opposition to said progressive movement so as to exert a final sorting action on said concentrate, and varying the extent of said cylindrical zone to thereby change the rate of sink product discharge.

27. A process for separating constituent solids of a body of intermixed composition according to the sink and float characteristics of the respective constituents in a body of fluent media, which comprises the treatment of such an intermixture in a confined annular zone of substantial vertical extent, subject to continuous feed and continuous separate discharge of the sink and float constituents at opposite ends of said zone, forming the material fed to said zone into three vertically spaced stages of treatment by supporting the material below said zone and subjecting said material throughout the vertical extent of said annular zone to horizontal centrifugal movement along one margin thereof relative to an opposite margin, the uppermost stage being a zone of float product concentration, the intermediate stage being a zone of sorting action, and the lowermost stage being a cylindrical zone for sink product concentration, subjecting the material in the annular zone to the action of an upcast hydraulic column, restricting the flow through the cylindrical zone, moving the sink product concentrate progressively from said annular zone to the cylindrical zone by the pressure of descending solids emerging from the base of said annular zone, subjecting said concentrate in its progressive movement to agitation directed in opposition to said progressive movement so as to exert a final sorting action on said concentrate, and varying the extent of said cylindrical zone to thereby change the rate of sink product discharge.

28. A process for separating constituent solids of a body of intermixed composition, according to the sink and float characteristics of the respective constituents in a body of fluent media, which comprises the treatment of such an intermixture in a confined annular zone of substantial vertical extent, subject to continuous feed and continuous separate discharge of the sink and float constituents at opposite ends of said zone, forming the material fed to said zone into three vertically spaced stages of treatment by supporting the material below said zone and subjecting said material throughout the vertical extent of said annular zone to horizontal centrifugal movement along one margin thereof relative to an opposite margin, the uppermost stage being a zone of float product concentration, the intermediate stage being a zone of sorting action, and the lowermost stage being a cylindrical zone for sink product concentration, subjecting the material in the annular zone to the action of a downcast hydraulic column, restricting the flow through the cylindrical zone, moving the sink product concentrate progressively from said annular zone to the restricted discharge by the pressure of descending solids emerging from the base of said annular zone, subjecting said concentrate in its progressive movement to agitation directed in opposition to said progressive movement so as to exert a final sorting action on said concentrate, and varying the extent of said cylindrical zone to thereby change the rate of sink product discharge.

HARRY L. McNEILL.

REFERENCES CITED

The following references are of record in the file of this patent:

UNITED STATES PATENTS

| Number | Name | Date |
|---|---|---|
| 655,125 | Stalcup | July 31, 1900 |
| 798,064 | Journeay | Aug. 29, 1905 |
| 856,612 | Wetherbee | June 11, 1907 |
| 1,010,348 | Cobb | Nov. 28, 1911 |
| 1,163,876 | Wetherbee | Dec. 14, 1915 |
| 1,478,761 | Rousseau | Dec. 25, 1923 |
| 1,895,505 | Wuensch | Jan. 31, 1933 |
| 2,288,744 | Remick | July 7, 1942 |
| 2,334,683 | Smith | Nov. 16, 1943 |
| 2,369,878 | Weigand | Feb. 20, 1945 |

FOREIGN PATENTS

| Number | Country | Date |
|---|---|---|
| 125,891 | Great Britain | Apr. 30, 1919 |